United States Patent [19]

Hose et al.

[11] Patent Number: 4,965,079
[45] Date of Patent: Oct. 23, 1990

[54] ACIDIFIED MILK PRODUCT OF CREAMY CONSISTENCY AND PROCESS FOR MAKING

[75] Inventors: Hugh Hose, Yverdon; Tomaso Sozzi, Lausanne; Robert D. Wood, Lausanne, all of Switzerland

[73] Assignee: Nestec S.A., Vevey, Switzerland

[21] Appl. No.: 260,442

[22] Filed: Oct. 20, 1988

[30] Foreign Application Priority Data

Oct. 6, 1988 [CH] Switzerland ............... 03713/88

[51] Int. Cl.$^5$ ............................... A23C 9/12
[52] U.S. Cl. ........................ 426/43; 426/583
[58] Field of Search ...................... 426/43, 583

[56] References Cited

U.S. PATENT DOCUMENTS

| | | | |
|---|---|---|---|
| 3,932,680 | 1/1976 | Egli et al. | 426/583 |
| 3,950,544 | 4/1976 | Fridman | 426/43 |
| 4,399,464 | 7/1982 | Vedamuthu | 426/43 |
| 4,416,905 | 11/1983 | Lundstedt et al. | 426/42 |

FOREIGN PATENT DOCUMENTS 907399 8/1972 Canada.
0187575 7/1986 European Pat. Off..
2165655 12/1970 Japan.

OTHER PUBLICATIONS

Tamine, A. Y. et al., 1985, Yogurt, Science and Technology, Pergamon Press, N.Y. pp. 21–23 and 162–165.
Kosikowski "Cheese & Fermented Milk Foods", 2nd Ed., 1977, Edwards Brothers, Ann Arbor, MI, p. 78.

Primary Examiner—Donald E. Czaja
Assistant Examiner—Helen Pratt
Attorney, Agent, or Firm—Vogt & O'Donnell

[57] ABSTRACT

An acidified milk product of creamy consistency obtained by acidification of a suspension of the skimmed milk type with a combination of roping and thickening lactic bacteria and showing high stability to hot coffee, to sterilization and in storage.

17 Claims, No Drawings

ACIDIFIED MILK PRODUCT OF CREAMY CONSISTENCY AND PROCESS FOR MAKING

BACKGROUND OF THE INVENTION

This invention relates to an acidified milk product of creamy consistency and to a process for its production.

Liquid yoghurts are examples of known acidified milk products of fluid and unctuous consistency.

A liquid yoghurt in Europe and Japan differs from a standard yoghurt in particular in its higher fats content, in its lower total dry matter content and in the fact that it has been subjected to homogenization.

A thin liquid yoghurt appears difficult to obtain without the addition of a stabilizer. Thus, in one known process for the production of a thin liquid yoghurt, a skimmed milk to which a few % of cane sugar and 0.2 to 0.3% of an optional stabilizer consisting of a mixture of gelatin and agar-agar is inoculated with a yoghurt culture comprising a strain of "*Lactobacillus bulgaricus*" and a strain of "*Streptococcus thermophilus*" capable of producing a stabilizer in situ and the fermentation process is carried out over a period of 8 to 15 h at 38° to 45° C. until the pH falls to 4.3.

However, none of these liquid yoghurts could be used instead of cream or coffee cream for example to whiten hot coffee, for example, because it would coagulate.

A so-called hypolipidic milk product is also known, being intended in particular to form a base for making various types of sauces. In the process for its production, a milk is biologically acidified to a pH below 4.5, starch, vegetable oil and stabilizers are incorporated therein, after which the product is heated very progressively with reduced stirring to 90° C., smoothed and packed at 90° to 95° C. A product such as this cannot be produced without the use of stabilizers, such as carrageenins and gums.

SUMMARY OF THE INVENTION

The object of the present invention is to provide an acidified milk product of creamy consistency which may contain little, if any, fats, which does not coagulate either during sterilization or when poured, for example, into hot coffee and which does not sediment in the event of prolonged storage in a hermetic pack although it does not have to contain an added stabilizer.

To this end, the acidified milk product according to the present invention is characterized by:
(i) a creamy consistency,
(ii) a viscosity of 1.6 to 4.2 mPa.s at 18° to 22° C.,
(iii) a pH of 6.2 to 6.5 at 18° to 22° C. and
(iv) a dry matter content of 7 to 45% by weight including
   0.03 to 22.5% fats and
   at least 6.97% non-fat solids comprising proteins, sugars and non-added roping and thickening agents.

Similarly, in the process according to the invention,
(a) an aqueous milk suspension having a dry matter content of 7 to 45% by weight including
   0.03 to 22.5% fats and
   at least 6.97% non-fat solids comprising proteins and fermentable sugars is prepared,
(b) the pH of the suspension is adjusted to 6.8 to 7.4 and
(c) the suspension is acidified by fermentation with a combination of strains of roping "*Lactobacillus bulgaricus*" and thickening "*Streptococus*" until the pH is in the range from 6.2 to 6.5 at 18° to 22° C.

It has surprisingly been found that it is thus possible to provide an acidified milk product of creamy consistency which may contain little, if any, fats, which is stable to heat and to an acidic environment, such as coffee for example, which keeps for months at ambient temperature without forming deposits and which contains no added stabilizer.

It has also been found that it is surprisingly possible, by acidification by fermentation in a relatively high and narrow pH range, to obtain a product which combines the desired creamy consistency with the required stability without a stabilizer having to be added.

It has been found in particular that it is possible to find among the roping "*Lactobacillus bulgaricus*" and the thickening "*Streptococcus*" for example, particularly among those which are commercially obtainable or those which may be isolated from commercial products, such as yoghurts or untreated milks and creams, strains which are capable of acidifying a milk suspension from a neutral pH of around 6.8 to 7.4 to a limiting pH of around 6.2 to 6.5 while, at the same time, producing roping and thickening agents sufficiently to provide the milk suspension with a creamy consistency.

It is the ability to remain at such a high pH after acidification which is in itself very surprising and which provides the product with remarkable stability both to sterilization and to hot coffee for example and also to prolonged storage in a hermetic pack.

DETAILED DESCRIPTION OF THE INVENTION

In the context of the invention, the expression "stability of the product to hot coffee" signifies the absence of any coagulation of the product, in other words, the absence of formation of granules of coagulum when the product is poured into a liquid having a temperature of around 80° C. and a pH of around 5, such as a cup of hot coffee prepared by infusion of roasted and ground coffee or by reconstitution of an instant coffee.

Similarly, the expression "stability of the product to sterilization" signifies the absence of any coagulation of the product in the event of a heat treatment, in the present case by indirect heating to temperatures above 100° C. for a few minutes for example.

The expression "stability of the product in storage" signifies the absence of any sedimentation of the product during storage in a hermetic pack for at least 3 months at ambient temperature.

The expressions "milk product" and "aqueous milk suspension" signify products and suspensions which may be obtained from an animal milk, a vegetable milk or from a mixture of components of an animal milk with substitution components of vegetable origin which have a composition and an appearance identical with or similar to those of an analogous product or suspension obtained from cows' milk.

The expression "creamy consistency" signifies a consistency which is both viscous and unctuous similar to that of the fresh cream obtained by scumming of cows' milk. The viscous consistency, i.e. the viscosity, is determined by a specific test described hereinafter just before the Examples. By contrast, the unctuous consistency is difficult to define by a physical value and is evaluated in the course of organoleptic tasting tests.

The acidified milk product according to the invention thus has a creamy consistency due to the roping and thickening agents present therein. These agents are not added, but are produced in situ during the acidification by fermentation.

These agents are produced in situ by fermentation with commercially available strains or with strains isolated from commercial products, particularly from yoghurts or from untreated milks and creams, or even with strains obtained from official collections.

These agents are preferably produced in situ by fermentation with a combination of strains of roping "*Lactobacillus bulgaricus*" and thickening "*Streptococcus*". In this combination, each strain appears to play a separate role. The roping "*Lactobacillus bulgaricus*" seems to produce an agent or polysaccharide having a roping effect which provides the milk product with its viscosity. The thickening "*Streptococcus*" seems to produce an agent or polysaccharide having a thickening effect which provides the milk product with its unctuousness.

A roping "*Lactobacillus bulgaricus*" which may be used for the purposes of the present invention may be found in particular among standard yoghurt cultures. Its optimal growth temperature is around 40° to 42° C., although it may also be active at a temperature as low as around 32° C. or as high as 45° C. A strain of "*Lactobacillus bulgaricus*" of this type isolated from a commercial yoghurt was deposited under the Budapest Treaty on 04.10.88 in the Collection Nationale de Cultures de Microorganismes (CNCM) de l'Institut Pasteur, 25 rue du Docteur Roux, 75724 Paris Cedex 15, France, where it was given the number I-800.

A thickening "Streptococcus" which may be used for the purposes of the invention can be found more particularly in naturally thick or unctuous dairy products, such as yoghurts, fresh creams or commercial sour creams. A thickening "Streptococcus" particularly recommendable for the purposes of the invention is distinguished, on the one hand, by biochemical behavior identical with that of "*Streptococcus cremoris*" as determined by the API test (R. Maissin et al., Belgian Journal of Food Chemistry and Biotechnology, 42/6 (1987), 176–183) and, on the other hand, by an ability to work not only in the range of about 27° to 32° C. typical of a mesophilic strain, but also in the temperature range rising from 32° C. to around 40° C. A thickening "Streptococcus" such as this is also capable of providing the acidified product with an agreeable flavour. Some "Streptococcus" strains of this type were deposited under the Budapest Treaty on 04.10.88 in the Collection Nationale de Cultures de Microorganismes (CNCM) de l'Institut Pasteur, 25 rue de Docteur Roux, 75724 Paris Cedex 15, where they were given the respective numbers I-801, I-802 and I-803. The first of these three strains was isolated from a commercial sour cream. The second was isolated from a commercial kefir. The third is a mutant strain distinct in regard to the texture produced during acidification from a strain of "*Streptococcus cremoris*" deposited on 21.11.84 in the CNCM where it bears the number 370.

The composition of the aqueous milk suspension used as starting material in the process according to the invention and the composition of the acidified milk product according to the invention show the differences from one another inherent in the fact that the second is the product of fermentation of the first. Accordingly, the second does not contain the substances consumed by the microorganisms during the fermentation process while the first does not contain the products of fermentation of those substances, namely the microorganisms themselves and the metabolites secreted by the microorganisms, including above all the roping and thickening agents. However, the quantities of dry matter consumed during the fermentation process represent only a fraction of a percent of the suspension. Accordingly, the overall composition of the starting suspension and that of the end product may be regarded as very similar, the main differences being reflected above all in the texture, pH and properties, such as stability to sterilization, to acidic media, particularly hot coffee, and in storage.

Thus, the acidified milk product according to the invention and the aqueous milk suspension prepared by the process according to the invention each have a dry matter content of approximately 7 to 45% by weight, including approximately 0.03 to 22.5% fats and at least about 6.97% non-fat solids.

The effect of a non-fat solids content below 6.97% is that the acidified milk product cannot have the desired creamy texture and remains too fluid, the thickening effect of fermentation being unable to be obtained. The effect of a non-fat solids content above 22.5% is to inhibit fermentation.

The non-fat solids of the aqueous milk suspension are preferably identical or similar in composition to the non-fat solids of cows' milk. They comprise in particular the nutritive substances necessary to the growth and activity of the microorganisms involved in the fermentation process. Accordingly, they comprise in particular fermentable sugars, proteins, oligoelements and vitamins. The fermentable sugars may be lactose, glucose and/or sucrose for example. The proteins may be of animal origin, such as casein and lactalbumin, or of vegetable origin, such as the proteins of cereals or pulses, particularly soya for example.

Accordingly, the dry matter content range of the acidified milk product and the aqueous milk suspension extends from 7 to 45%. The difference of 0.03% between the minimum dry matter content and the minimum non-fat solids content reflects the fact that it is impossible completely to eliminate the residual fats from a skimmed milk for example. The maximum dry matter content is equal to the sum of the maximum content of fats envisaged and the maximum non-fat solids content beyond which fermentation is inhibited.

In practice, it is possible to select a low fats content which may even be as low as possible where it is desired to obtain a hypocaloric acidified milk product of creamy texture suitable, for example, for whitening coffee. It is possible to select higher fat contents which may even be as high as 22.5% where it is desired to obtain an acidified milk product suitable, for example, as a base for sauces. With fat contents above 22.5%, the product is in danger of no longer being liquid enough for the roping and thickening effect of the fermentation process to be noticeable. The fats may be of animal origin, such as cream from cows' milk for example, or vegetable origin, such as cocoa butter for example.

To carry out the process according to the invention, therefore, an aqueous milk suspension having the composition described above is prepared. This may be done by concentrating or standardizing an optionally skimmed cow's milk either fresh or reconstituted from powdered milk for example. It is also possible to mix and/or standardize milks of different animal or vegetable origins, particularly freshly prepared or powdered soya milks for example. Standardization to a composition falling within the scope of the present invention may be obtained by addition of non-fat milk solids, vegetable proteins, fermentable sugars, cream or vegetable fats for example.

This aqueous milk suspension may be homogenized, optionally after preheating to 45°–75° C. for example, under a pressure of approximately 150 to 400 bar for example. The suspension may then be pasteurized, for example for 30 seconds to 15 minutes at a temperature of 75° to 95° C., or sterilized, for example for 10 seconds to 30 minutes at 110° to 150° C.

The pH of the aqueous milk suspension may then be adjusted to a value of from about 6.8 to 7.4 and preferably from 6.9 to 7.1, for example by addition of KOH or NaOH. The object of this pH adjustment is to give the microorganisms used for fermentation a sufficiently wide acidification margin for them to be able to produce a sufficient quantity of roping and thickening agents.

This suspension may be inoculated with approximately 1.05 to 6% by volume of a mixture of cultures comprising 1 to 4% of a culture of roping "*Lactobacillus bulgaricus*" and 0.05 to 2% of a culture of thickening "*Streptococcus*", each of these separate cultures containing a strain of the microorganism in question in a proportion of $10^8$ to $10^9$ germs/cm$^3$.

The suspension thus inoculated may then be left to ferment, preferably in a tank, at a temperature of 30 to 40° C. and preferably at a temperature of 34° to 36° C., which is favorable to the growth of each of the two strains forming the above-mentioned combination, over a period of about 1.5 to 10 hours and preferably over a period of 2 to 6 hours until the pH is in the range from 6.2 to 6.5, as measured at 18° to 22° C.

If the suspension is left to ferment to a pH below 6.2, the acidified milk product is in danger of not having the desired stability, particularly to heat and to acidic media. If the suspension is not allowed to ferment to a pH of at most 6.5, the production of roping and thickening agents might be inadequate.

On the other hand, if the time necessary to reach the desired pH is too short, namely below 1.5 h and even below 2 h, the product is in danger of coagulating before showing the desired viscosity. If the time required to reach the desired pH is too long, namely above 10 h or even 6 h, there is a risk of contamination by a strain foreign to the process which would take over from the strains of the process.

The acidified milk product may be pasteurized, for example for about 30 seconds to 15 minutes at a temperature of approximately 75° to 95° C., in order completely to stop the metabolism of the microorganisms used. Pasteurization may be carried out, for example, in a tube after the milk has been cooled, for example to 15°–28° C.

The acidified milk product may then be packed in hermetic packs, such as metallized cups or glass bottles for example, and sterilized in this pack, for example for 1 to 60 minutes at 110° to 130° C. It may also be sterilized by indirect heating before aseptic packing in hermetic packs, for example of plastics or laminated cardboard.

The acidified milk product thus obtained thus has a creamy consistency and does not precipitate either on sterilization or when poured, for example, into a cup of hot coffee instead of cream or commercial cream. It keeps very well in hermetic packs in which it does not show any sign of sedimentation after storage, for example for at least 3 months at ambient temperature. The acidified milk product may also be used as a base of creamy consistency for the preparation of sauces and soups.

EXAMPLES

The product and the process according to the invention are illustrated by the following Examples in which percentages and parts are by weight, unless otherwise indicated. The Examples are preceded by the description of a test used to determine the viscosity of the product. They are completed by Comparison Examples illustrating the fact that, on the one hand, the pH value reached during acidification by fermontation is particularly critical and that, on the other hand, the use of only one of the two strains forming the specified combination is doomed to failure.

Viscosity Test

The test comprises measuring the time taken by 100 ml of liquid to flow through a vertical cylindrical tube 17 mm in height and 2.8 mm in diameter.

The acidified milk product according to the invention is assumed to be a newtonian liquid in the same way as water. Accordingly, it is assumed that the flow rate of the product and the flow rate of water in the same cylindrical tube are inversely proportional to their respective viscosities.

The viscosity of the product according to the invention is thus equal to the viscosity of water (1 mPa·s) divided by the time measured by the present test for water (12 s) and multiplied by the time measured by the present test for the product according to the invention.

EXAMPLE 1

500 kg of an aqueous milk suspension are prepared by mixing 79.5% water, 17% skimmed cows' milk in powder form, 3.4% butter and 0.1% yeast extract.

The suspension is preheated to 70° C. by heat exchange and then sterilized by the injection of steam at 140° C. for 10 seconds.

The suspension is cooled to 60°–65° C. by expansion and heat exchange. It is then adjusted to pH 7.1 by addition of a mixture of KOH and NaOH and homogenized under a pressure of 180 bar.

The suspension is cooled to 34° C. by heat exchange and then introduced into an acidification tank. The suspension is inoculated with 10 l of a culture of roping "*Lactobacillus bulgaricus*" CNCM I-800 containing $10^8$–$10^9$ germs of this microorganism per cm$^3$ and with 250 cm$^3$ of a culture of thickening "*Streptococcus cremoris*" CNCM I-801 containing $10^8$–$10^9$ germs of this microorganism per cm$^3$.

The suspension is left to ferment for 4 hours at 34° C., followed by racking of the acidified product which has a pH of 6.32 (approximately 6.42 at 20° C.) and a viscosity of 1.96 mPa·s.

The racked product is first cooled by heat exchange to 15° C. and then pasteurized for 3 minutes at 75° C. in order first to decelerate fermentation and then to inactivate the microorganisms. The racked and pasteurized product is delivered to a dwell tank in which it is cooled and kept at 8° C.

During the racking process, which lasts approximately 17 minutes, fermentation continues in the acidification tank. The product racked on completion of this operation has a pH value of 6.26 (approximately 6.36 at 20° C.) and a viscosity of 2.83 mPa·s.

The product collected in the dwell tank has a pH of 6.4 at 20° C. and a viscosity of 2.1 mPa·s at 20° C. It has a creamy consistency and, particularly in the mouth, an unctuousness comparable with that of fresh liquid cream from cows' milk. It is stable to hot coffee.

Part of this product is packed in 2 dl glass bottles and another part in 12 ml metallized cups.

The bottled product is sterilized for 2 minutes at 122° C. while the product in the cups is sterilized for 2.5 minutes at 121° C. The sterilized product in the bottles has a pH of 6.3 and a viscosity of 3.29 mPa·s at 20° C. while the sterilized product in the cups has a pH of 6.3 and a viscosity of 2.56 mPa·s at 20° C.

The two sterilized products have a creamy consistency and, particularly in the mouth, an unctuousness comparable with that of fresh liquid cream from cows' milk. They are stable to hot coffee. They are also stable in storage insofar as they show no sign of sedimentation after storage for 3 months at ambient temperature.

COMPARISON EXAMPLE A

The procedure is as described in Example 1, except that a four times larger quantity of aqueous milk suspension is prepared and fermentation is mistakenly allowed to continue to pH 6.0 at 34° C. (approximately pH 6.1 at 20° C.).

The product thus obtained is not stable to hot coffee, forming a quantity of small granules of coagulum. It is no longer stable to sterilization during which it coagulates completely.

COMPARISON EXAMPLE B

Attempts are made to prepare an acidified milk product of creamy consistency using the process according to the invention except for the fact that a culture of roping "*Lactobacillus bulgaricus*" is used on its own instead of a mixture of a culture of this microorganism and a culture of thickening "Streptococcus". Three tests are carried out with three separate strains of roping "*Lactobacillus bulgaricus*" each of which normally lends itself to the process in combination with a suitable strain of thickening "Streptococcus".

For each of these three tests, an aqueous milk suspension is prepared by mixing 18% of skimmed cows' milk in powder form, 3% oil, 0.1% yeast extract and 78.9% hot water. The suspension is preheated to 70° C. and sterilized for 10 seconds at 140° C. It is then cooled to 60°–65° C., adjusted to pH 7.0 and homogenized under 180 bar. The suspension is then cooled and introduced into a 1 liter fermenter in which it is inoculated with 20 cm$^3$ of a culture of one of the three following strains of roping "*Lactobacillus bulgaricus*":

(i) a mutant strain distinct in regard to phage sensitivity from the strain CNCM I-800,
(ii) another strain isolated from commercial yoghurt,
(iii) the strain CNCM I-800, each culture containing $10^8$–$10^9$ germs/cm$^3$. The suspension is left to ferment for 4 hours 20 minutes–4 hours 30 minute at 34° C. to a pH value of 6.4 (approximately pH 6.5 at 20° C.).

Three acidified milk products are obtained, each having a satisfactory viscosity at 20° C., namely (i) 2.08 mPa·s, (ii) 1.92 mPa·s and (iii) 2.0 mPa·s. However, none of these products has the desired unctuousness. Each of the products has an excessively ropy texture as verified by the formation of extremely fine threads reminiscent of those of a cobweb.

COMPARISON EXAMPLE C

Attempts are made to prepare an acidified milk product of creamy consistency using the process according to the invention except for the fact that a culture of thickening "Streptococcus" is used on its own instead of a mixture of a culture of this microorganism and a culture of roping "*Lactobacillus bulgaricus*". Three tests are carried out at different fermentation temperatures with a strain of thickening "Streptococcus" which normally lends itself to the process in combination with a suitable strain of roping "*Lactobacillus bulgaricus*".

Each of these three tests is carried out in the same way as described in Comparision Example B up to the filling of the 1 liter fermenter with the sterilized and homogenized aqueous milk suspension. The suspension is inoculated with 10 cm$^3$ of a culture of thickening "*Streptococcus cremoris*" CNCM I-801 containing $10^8$–$10^9$ germs/cm$^3$ and is then left to ferment to pH 6.4 (approximately pH 6.5 at 20° C.).

The fermentation temperature, the time necessary to reach pH 6.4 and the viscosity at 20° C. shown by the milk products obtained during these three tests are, respectively, 39° C., 3 hours 20 minutes and 1.13 mPa·s; 36° C., 3 hours 30 minutes and 1.13 mPa·s; 33° C., 4 hours 20 minutes and 1.25 mPa·s.

Each of these products shows a detectable and satisfactory unctuousness in the mouth, but an inadequate viscosity.

EXAMPLES 2 to 9

Eight acidified milk products are prepared by fermentation with eight different combinations of strains of roping "*Lactobacillus bulgaricus*" and thickening "Streptococcus". These combinations involve two different strains of the first microorganism and four different strains of the second, namely:

(I) a mutant strain of roping "*Lactobacillus bulgaricus*" distinct in regard to phage sensitivity from the strain CNCM I-800
(II) another strain of roping "*Lactobacillus bulgaricus*" isolated from a commercial yoghurt
(III) the strain of thickening "*Streptococcus cremoris*" CNCM I-801
(IV) the strain of thickening "*Streptococcus cremoris*" CNCM I-802
(V) the strain of thickening "*Streptococcus cremoris*" CNCM I-803
(VI) another mutant strain of thickening "*Streptococcus cremoris*" distinct in regard to the texture produced during acidification from the strain of "*Streptococcus cremoris*" deposited on 21.11.84 in the CNCM where it bears the number 370.

For each of these Examples, an aqueous milk suspension is prepared by mixing 18% skimmed cows' milk in powder form, 3% oil, 0.1% yeast extract and 78.9% hot water. The suspension is preheated to 70° C. and sterilized for 10 seconds at 140° C. It is then cooled to 60°–65° C., adjusted to pH 7.0 and homogenized under 180 bar. The suspension is then cooled and introduced into a 1 liter fermenter in which it is inoculated with 20 cm$^3$ of one of the two above cultures of "*Lactobacillus bulgaricus*" (I and II) and with 0.5 cm$^3$ of one of the four above cultures of thickening "Streptococcus" (III, IV, V and VI), each culture containing $10^8$–$10^9$ germs/cm$^3$.

The suspension is then left to ferment at 34° C. for 4 hours–4 hours 30 minutes to a pH value of 6.4 (approximately pH 6.5 at 20° C.). The exact fermentation time for each combination and the viscosity of the products obtained are shown in the following Table:

| Example no. | Combination L + S | Fermentation time (h and mins.) | Viscosity (mPa · s) |
|---|---|---|---|
| 2 | I + III | 4 h 15 | 1.83 |
| 3 | I + IV | 4 h 25 | 1.87 |
| 4 | I + V | 4 h 25 | 1.83 |
| 5 | I + VI | 4 h 25 | 1.83 |
| 6 | II + III | 4 h 05 | 1.92 |
| 7 | II + IV | 4 h 20 | 1.92 |
| 8 | II + V | 4 h 30 | 1.92 |
| 9 | II + VI | 4 h 15 | 1.92 |

Each of these eight products has a creamy consistency and, in particular, an unctuousness in the mouth comparable with that of fresh liquid cream from cows' milk. Each of these eight products is also stable to hot coffee, to sterilization and in storage.

We claim:

1. A process for providing an acidified milk product of creamy consistency comprising:
   preparing an aqueous milk suspension having a dry matter content of 7 to 45% by weight including from 0.03% to 22.5% fats by weight and including at least 6.97% non-fat solids by weight comprising proteins and fermentable sugars;
   adjusting the pH of the suspension to a pH of from 6.8 to 7.4f and
   fermenting the pH adjusted suspension with a combination of roping *Lactobacillus bulgaricus* and of thickening Streptococcus for from 1.5 hours to 10 hours at a temperature of 30° to 40° C. for obtaining a fermented product having a pH of from 6.2 to 6.5 at a temperature of from 18° C. to 22° C.

2. A process according to claim 1 wherein the pH adjusted suspension is fermented for from 2 hours to 6 hours.

3. A process according to claim 2 wherein the pH adjusted suspension is fermented at a temperature of from 34° C. to 36° C.

4. A process according to claim 1 wherein the Streptococcus is a *Streptococcus cremoris* strain.

5. A process according to claim 1 wherein the thickening Streptococcus is a strain selected from the group of strains consisting of CNCM I-801, CNCM I-802 and CNCM I-803.

6. A process according to claim 1 wherein the roping *Lactobacillus bulgaricus* is strain CNCM I-800.

7. A process according to claim 5 wherein the roping *Lactobacillus bulgaricus* is strain CNCM I-800.

8. A process according to claim 1 further comprising pasteurizing the fermented suspension.

9. A process according to claim 1 further comprising sterilizing the fermented suspension.

10. A process according to claim 8 further comprising sterilizing the pasteurized suspension.

11. A process according to claim 1 further comprising packaging the fermented suspension in a hermetic pack and sterilizing the packed suspension for 1 to 60 minutes at a temperature of 110° C. to 130° C.

12. The product of the process of claim 1.

13. The product of the process of claim 7.

14. A fermented milk product comprising a dry matter content of from 7% to 45% by weight including at least 6.97% non-fat solids by weight comprising proteins, sugars and roping and thickening agents and including from 0.03% to 22.5% fats by weight and having a pH of from 6.2 to 6.5 at a temperature of from 18° C. to 22° C. and a viscosity of from 1.6 mPa to 4.2 mPa at a temperature of from 18° C. to 22° C.

15. A product according to claim 14 wherein the product is pasteurized.

16. A product according to claim 14 wherein the product is sterilized.

17. A product according to claim 14 wherein the product is pasteurized and sterilized.

* * * * *

UNITED STATES PATENT AND TRADEMARK OFFICE
CERTIFICATE OF CORRECTION

PATENT NO. : 4,965,079

DATED : October 23, 1990

INVENTOR(S) : Hugh HOSE, et al.

It is certified that error appears in the above-identified patent and that said Letters Patent is hereby corrected as shown below:

On the title page of the patent, in the title, delete "FOR" and insert therefor --OF--.

On the title page of the patent, under the heading U.S. PATENT DOCUMENTS, line 3, "4,399,464" should be --4,339,464--.

Column 1, line 3, delete "FOR" and insert therefor --OF--.

Column 9, line 30 [claim 1], after "7.4" delete the "f" and insert a semicolon.

Signed and Sealed this

Twenty-first Day of January, 1992

Attest:

HARRY F. MANBECK, JR.

*Attesting Officer*     *Commissioner of Patents and Trademarks*